(12) United States Patent
Derman

(10) Patent No.: US 12,510,051 B1
(45) Date of Patent: Dec. 30, 2025

(54) SPINNING ENERGY DEVICE

(71) Applicant: Jay S Derman, Carlsbad, CA (US)

(72) Inventor: Jay S Derman, Carlsbad, CA (US)

(*) Notice: Subject to any disclaimer, the term of this patent is extended or adjusted under 35 U.S.C. 154(b) by 0 days.

(21) Appl. No.: 19/062,855

(22) Filed: Feb. 25, 2025

Related U.S. Application Data

(60) Provisional application No. 63/636,825, filed on Apr. 21, 2024.

(51) Int. Cl.
| | |
|---|---|
| F03D 3/00 | (2006.01) |
| H02K 7/102 | (2006.01) |
| H02K 7/116 | (2006.01) |
| H02K 7/18 | (2006.01) |
| H02K 11/00 | (2016.01) |

(52) U.S. Cl.
CPC ............. F03D 3/009 (2023.08); H02K 7/102 (2013.01); H02K 7/116 (2013.01); H02K 7/183 (2013.01); H02K 11/0094 (2013.01)

(58) Field of Classification Search
CPC ........ F03D 3/009; H02K 7/102; H02K 7/116; H02K 7/183; H02K 11/0094
See application file for complete search history.

(56) References Cited

U.S. PATENT DOCUMENTS

| | | |
|---|---|---|
| 7,381,030 B1 | 6/2008 | Vanderhye |
| 10,612,515 B2 | 4/2020 | Reyna et al. |
| 11,519,551 B1 | 12/2022 | Derman |
| 11,549,485 B1 | 1/2023 | Plemmons |
| 11,939,963 B1 | 3/2024 | Derman |
| 2006/0188364 A1* | 8/2006 | Fritz ............... F03D 9/12 415/4.2 |
| 2009/0196763 A1 | 8/2009 | Jones et al. |
| 2010/0109336 A1* | 5/2010 | Lee ................. F03D 9/25 290/55 |
| 2015/0167636 A1* | 6/2015 | Al-Garni ......... H02S 10/12 290/55 |
| 2016/0312768 A1 | 10/2016 | Takakura |
| 2021/0391778 A1 | 12/2021 | Pederson et al. |

FOREIGN PATENT DOCUMENTS

| | | | | |
|---|---|---|---|---|
| EP | 3012450 A1 * | 4/2016 | ............. | F03D 15/10 |
| RU | 2769560 C1 * | 4/2022 | ............. | F03D 9/30 |
| WO | WO-2011116440 A1 * | 9/2011 | ............. | F03D 13/20 |
| WO | WO-2013114561 A1 * | 8/2013 | ............. | F03D 3/005 |

* cited by examiner

Primary Examiner — Viet P Nguyen
(74) Attorney, Agent, or Firm — Plager Schack LLP; Mark H. Plager; Naomi Mann

(57) ABSTRACT

A spinning device comprising a blade assembly including a hollow body, and a rod coupled to the hollow body is configured to generate energy. A base housing is configured to support the spinning device and houses a generator and battery of the device.

10 Claims, 5 Drawing Sheets

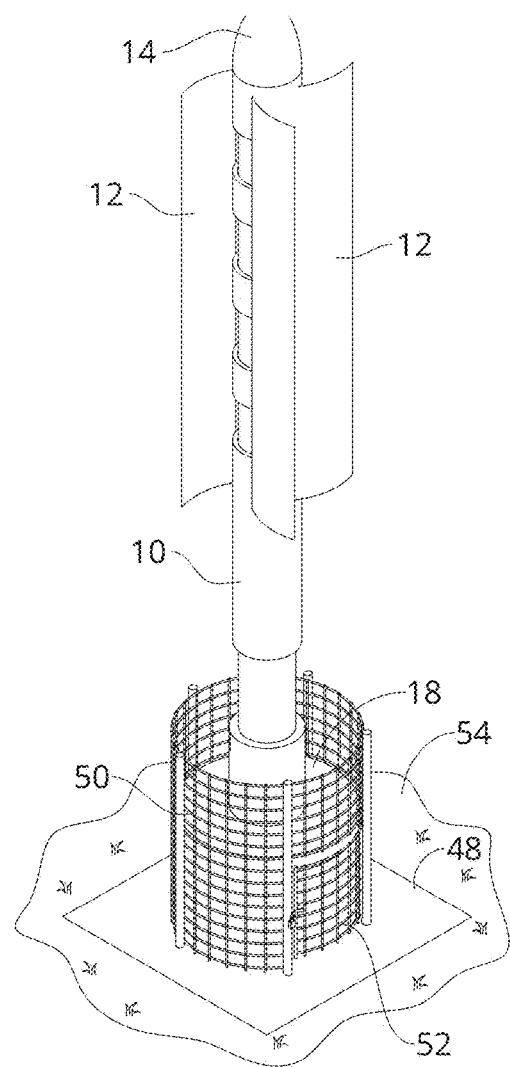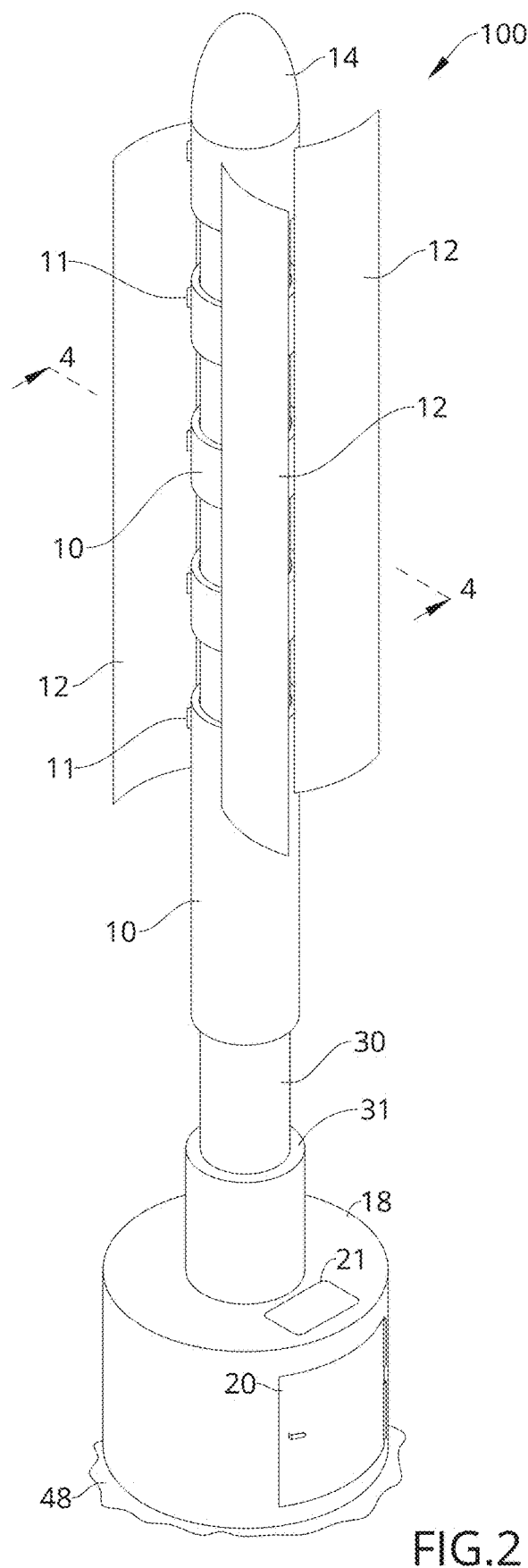
FIG.1
FIG.2

SPINNING ENERGY DEVICE

RELATED APPLICATION

This application claims benefit to U.S. Provisional Application No. 63/636,825 filed Apr. 21, 2024, which is incorporated by reference herein in its entirety.

BACKGROUND

The present disclosure relates generally to energy harvesting devices and systems, and more specifically, to an improved system for harvesting wind energy.

SUMMARY

According to various embodiments, disclosed is an energy generator system, which may comprise a vertical shaft; a blade assembly comprising vertically elongated blades, the blade assembly supported on the vertical shaft and configured to spin the vertical shaft; and at least one generator including a generator battery configured to harness energy via a rotation of the vertical shaft effectuated by wind forces on the blade assembly. The system may further include a transfer gear coupled between the vertical shaft and the generator, the transfer gear being configured to transfer rotation of the vertical shaft to a generator shaft coupled between the transfer gear and the generator, wherein the vertical shaft is at a right angle to the generator shaft. In some further embodiments, a base housing is configured to house the transfer gear, the generator, and the generator battery, the base housing including a side wall and a top wall over the side wall, the top wall including an opening into which a lower end of the vertical shaft extends.

BRIEF DESCRIPTION OF THE FIGURES

The detailed description of some embodiments of the invention will be made below with reference to the accompanying figures, wherein the figures disclose one or more embodiments of the present invention.

FIG. 1 is a perspective view of an energy generator system, in accordance with certain embodiments.

FIG. 2 is a detailed perspective view of the energy generator system, with a fence component of the system removed for clarity.

DETAILED DESCRIPTION OF CERTAIN EMBODIMENTS

Figure 3:
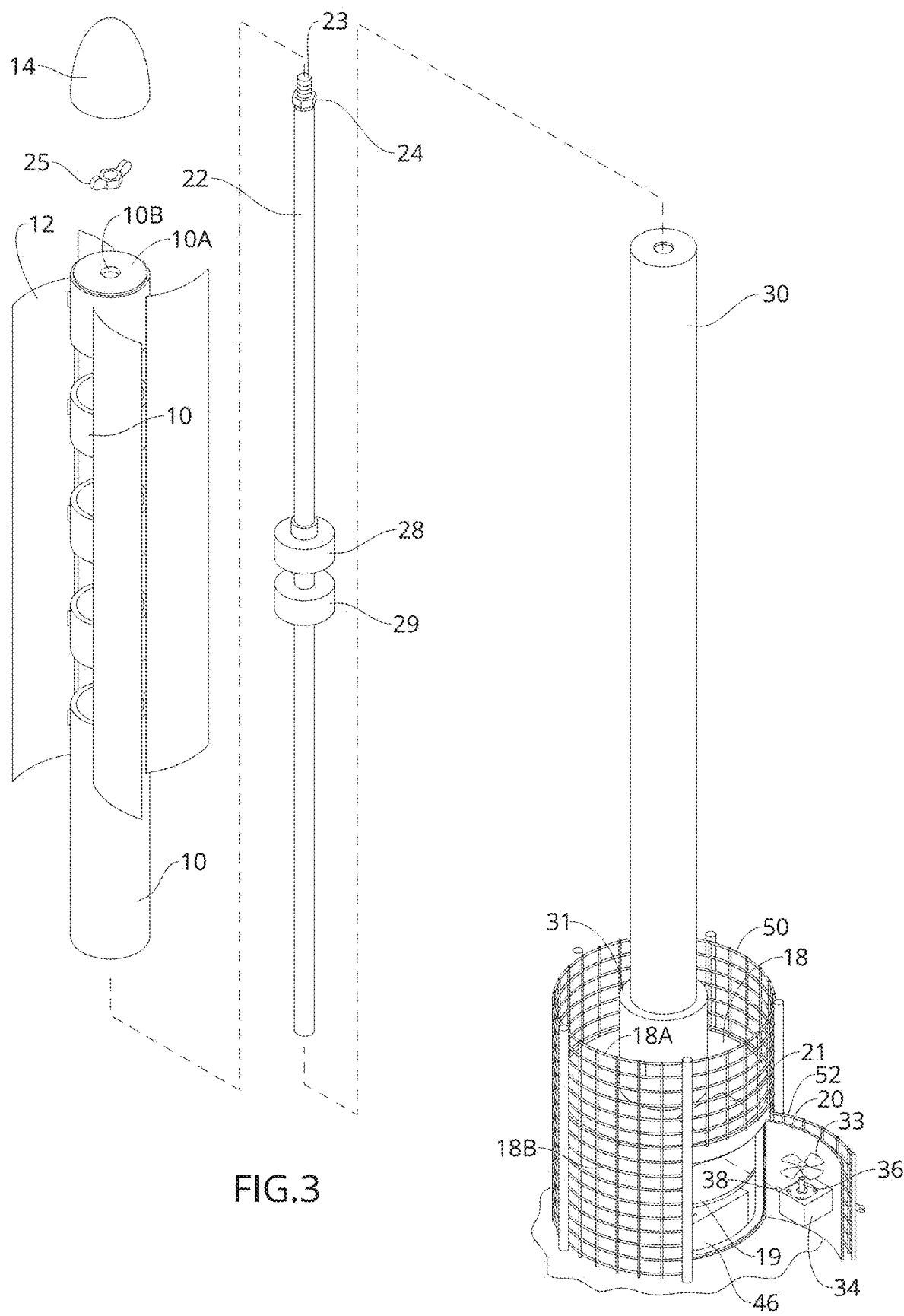
FIG. 3 is an exploded view of the energy generator system.
Figure 4:
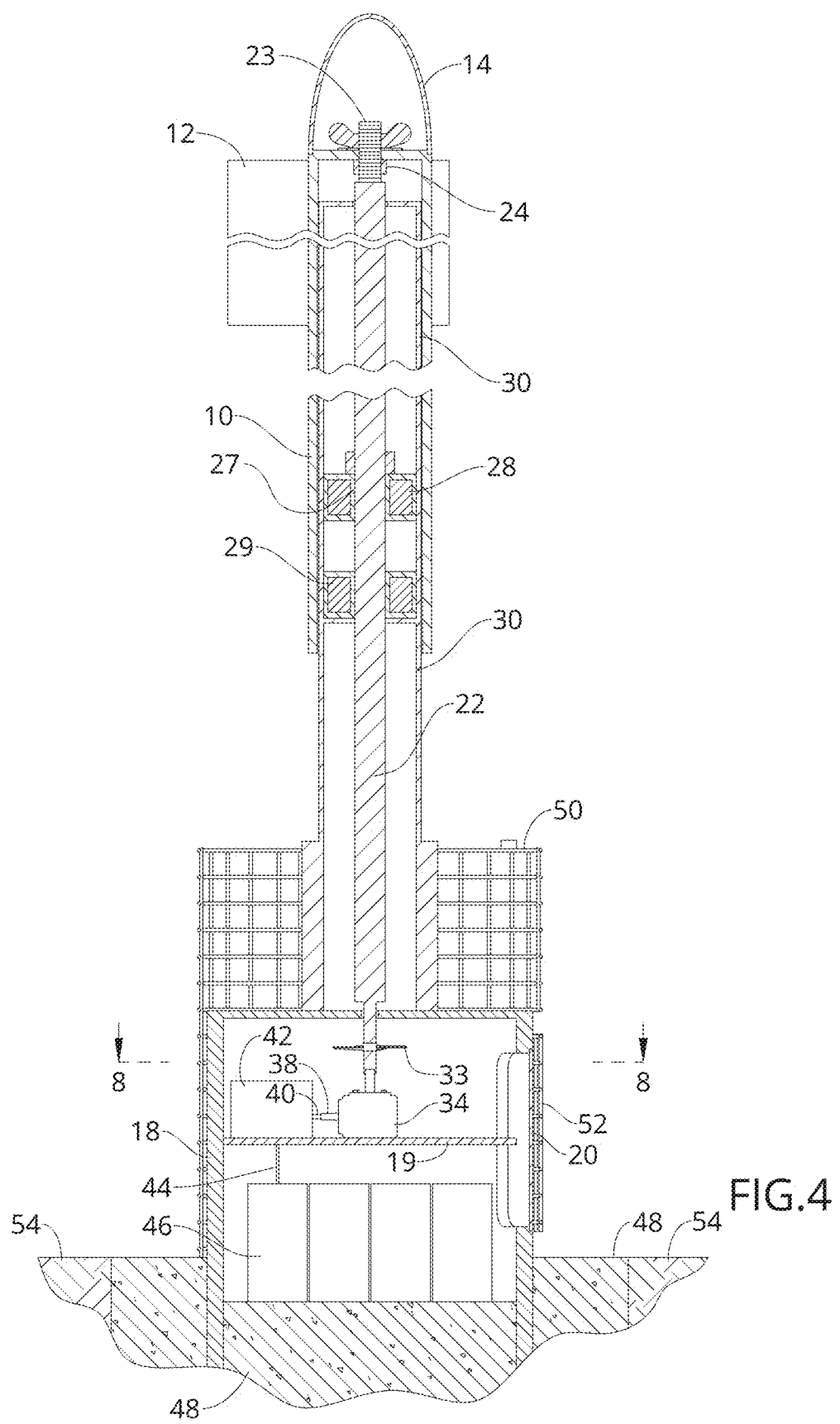
FIG. 4 is a section view taken along line 4-4 in FIG. 2, wherein a right-angle transfer gear component and a generator component of the system are shown in full for clarity.
Figure 5:
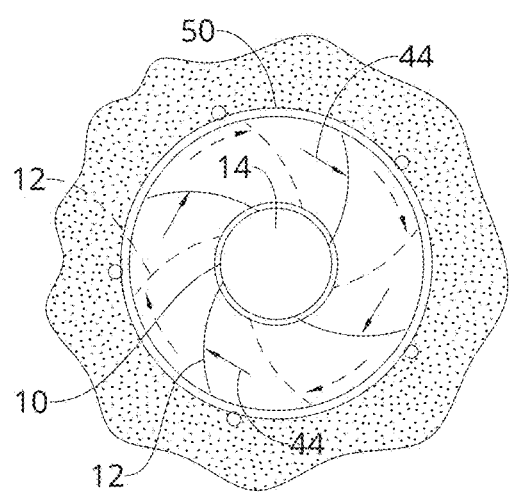
FIG. 5 is a top view, showing the spinning of a blade assembly when blown by wind.
Figure 7:
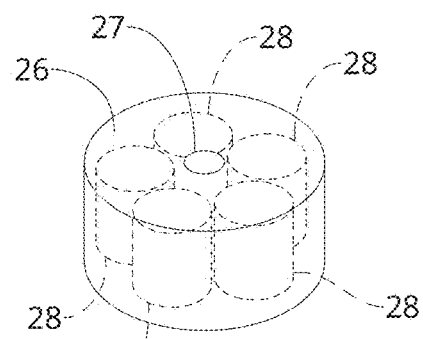
FIG. 7 is a detailed view of a magnetic assembly component of the system, according to an exemplary embodiment.
Figure 6:
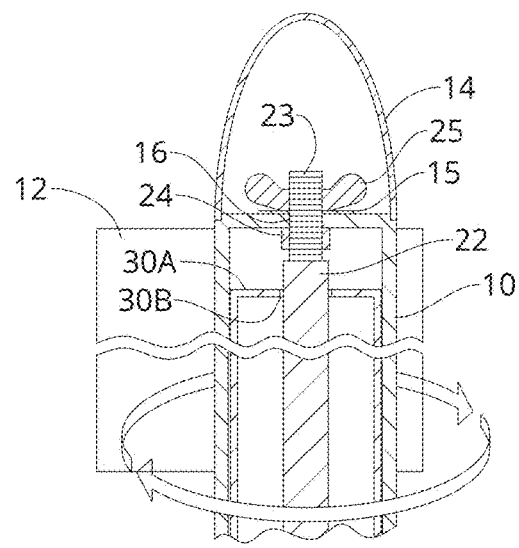
FIG. 6 is a detailed section view, showing the free spinning of a tube and blades around stationary tube of the system to turn the system shaft which is connected to the right-angle transfer gear that turns a generator shaft for powering a system generator.
Figure 6:
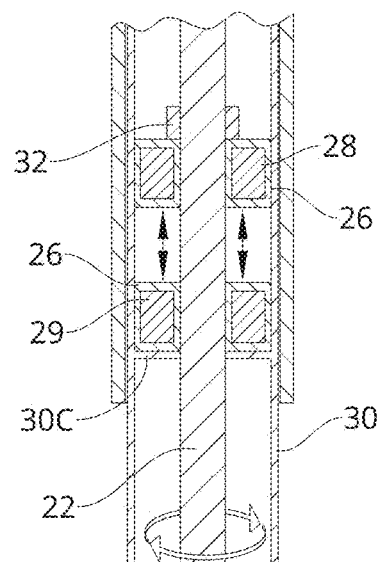
Figure 6:
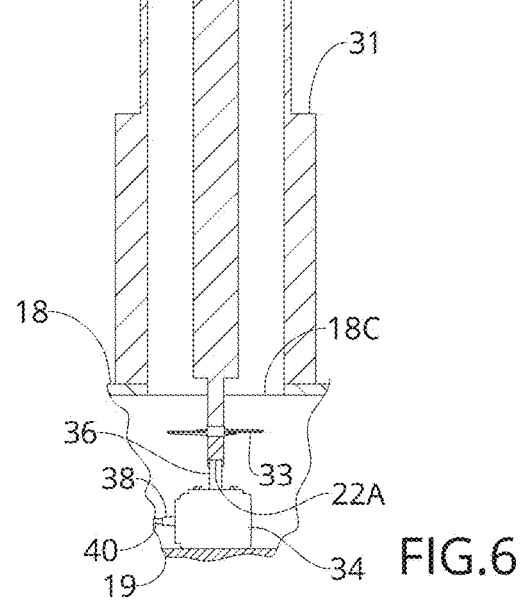
Figure 8:
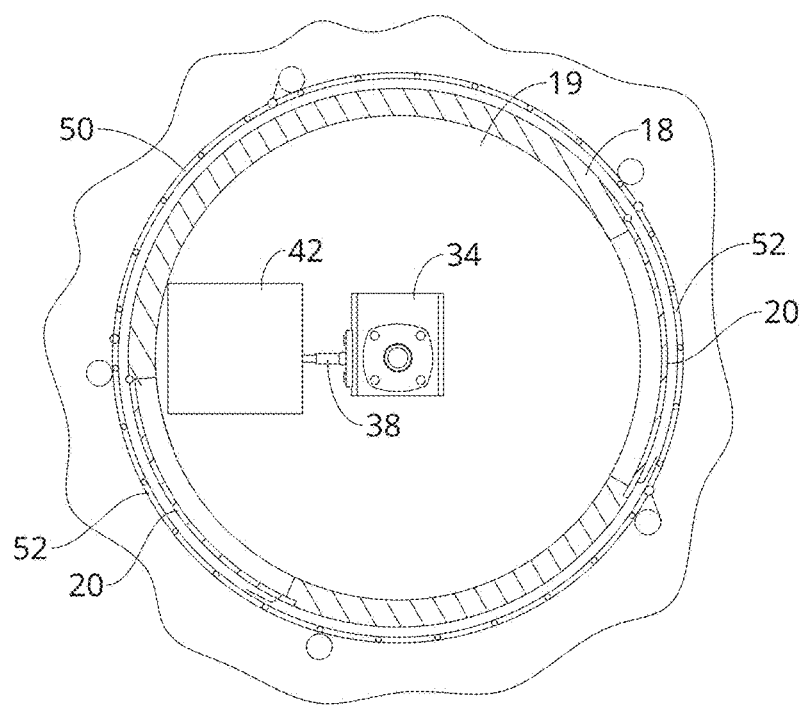
FIG. 8 is a section view along line 8-8 in FIG. 4.

According to various embodiments as depicted in FIGS. 1-9, disclosed is an energy generator system 100 generally comprising a blade assembly 12 supported on a vertical shaft 22, said shaft 22 being coupled to a generator 42 that harnesses energy from the rotation of the shaft 22, wherein blade assembly 12 is configured to effectuate a rotation of shaft 22 via wind forces. In further embodiments, a magnetic levitation assembly 26 is configured to reduce or eliminate an effective weight of the vertical shaft 22 on a shaft connector 36 which is coupled to the generator, enabling vertical shaft 22 to rotate with reduced frictional forces. In certain embodiments, magnetic assembly 26 includes an upper magnetic component 28 which is coupled to shaft 22, and a lower magnetic component 29 which is fixed in vertical position with respect to system 100, but is not coupled to shaft 22. In certain embodiments, blade assembly 12 may be supported on a rotating blade tube 10 which is coupled to shaft 22. In further embodiments, shaft 22 passes through a stationary tube 30 which nests within rotating tube 10 and supports lower magnetic component 29 of magnetic assembly 26.

In certain embodiments, shaft 22 may be configured to rotate shaft connector 36 coupled to generator 42, wherein magnetic levitation assembly 26 effectuates a vertically upwards or lifting force on shaft 22 with respect to shaft connector 36 to reduce frictional forces due to vertical normal forces between the bottom end of the shaft 22 and the top end of shaft connector 36. In some embodiments, shaft connector 36 may comprise a vertical member with at least one flat side surface, configured to be received within a correspondingly configured hollow 22A in the bottom end of shaft 22. In alternate embodiments, shaft connector 36 may conversely provide a hollow in its top end for receiving shaft 22, wherein shaft 22 may include at least one flat surface at its bottom end portion. It shall be appreciated that shaft connector 36/hollow 22A may comprise any number of flat surfaces in alternate embodiments. In one example, shaft connector 36 may be a D-shaft with one flat surface. In further embodiments, a shaft set screw may be used to secure shaft 22 to shaft connector 36. Magnetic levitation assembly 26 lifts shaft 22 to create a separation between potential horizontal contact surfaces and/or reduce the effective weight of the shaft on shaft connector 36 thereby reducing frictional forces as the shaft rotates.

Figure 9:
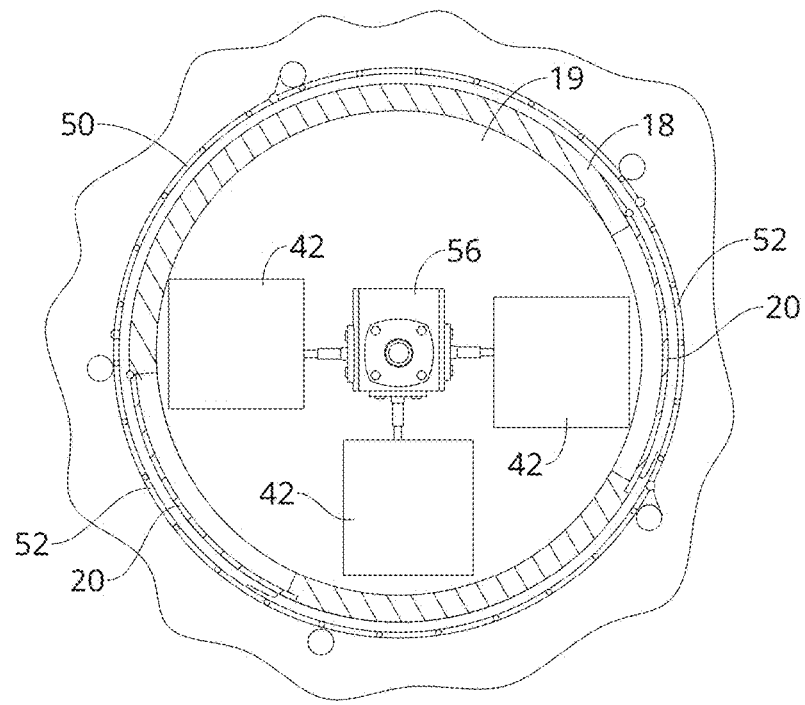
FIG. 9 is a section view showing an alternate arrangement that includes multiple generators.

In one embodiment, shaft connector 36 may be coupled between vertical shaft 22 and generator 42 via a right-angle transfer gear 34 configured to transfer rotation of connector 36 to a generator shaft 40, wherein generator shaft 40 is at a right angle to vertical shaft 22 and shaft connector 36, and may be coupled to transfer gear 34 via a generator shaft connector 38. In some embodiments, right-angle transfer gear 34 may be a speed reducer gearbox which may include a safety brake. In some embodiments as best depicted in FIG. 9, a multiple output right angle gear 56 may be used to transfer rotational energy to multiple generators. In some further embodiments, one or more batteries 46 may be provided for storage of the generated energy, whereby generator(s) 42 may be coupled to batteries 46 via a generator output line 44. It shall be appreciated that different components may be used for engaging shaft 22 to generator 42 in alternate embodiments, and that transfer gear may be omitted in certain alternate embodiments.

In certain embodiments, energy generator assembly 100 comprises a base housing 18 configured to securely hold internal stationary tube 30 support shaft 22 in place. Housing 18 is further configured to retain energy generator(s) 42, transfer gear 34/56, and batteries 46. In some embodiments, base housing 18 may be made of concrete or similar material. In some embodiments, base housing 18 may generally include a top wall 18A, and side wall(s) 18B. Additionally, one or more housing access door(s) 20, and one or more top access hatch door(s) 21 may be provided within top wall 18A and side wall(s) 18B, respectively. In some embodiments, as depicted in the figures, housing 18 may be cylindrical, but not necessarily so. In further embodiments, the diameter of housing 18 is greater than the diameter of the blade assembly 12. In certain embodiments, a fence 50 may be provided around housing, and includes one or more locking fence door(s) 52 which may be positioned over housing access door(s) 20. In some embodiments, fence 50 may provide a protective area around housing 18, and may be constructed with a height sufficient to prevent vandalism or human injury.

In certain embodiments, top wall 18A of base housing 18 includes an opening 18C through which a bottom portion of shaft 22 passes for engagement with connector 36. In some embodiments, opening may include a ball bearing ring for stability and reduced friction. In further embodiments, a stationary collar 31 around opening 18C may be firmly affixed to the housing top wall 18A, and holds stationary internal tube 30 in fixed position, wherein the internal hollow of the stationary tube is continuous with opening 18C. It shall be appreciated that other components for securing internal tube 30 to housing 18 may be used in alternate embodiments.

In some embodiments, base housing 18 may be embedded below ground 54 and within poured footing 48 for maintaining generator assembly in a fixed and sturdy position. It shall be appreciated that base housing 18 may have different sizes and be positioned at different depths according to various embodiments. In one embodiment, base housing 18 may include an interior shelf 19 below top wall 18A which supports energy generator(s) 42 and transfer gear 34/56, whereby batteries 46 are supported below shelf 19 on poured footing 48. In some further embodiments, base housing 18 may include various cooling components. In one embodiment, a fan 33 may be mounted to a component of shaft 22 that extends into housing 18 and may spin together with shaft 22 to provide cooling. It shall be appreciated that in alternate embodiments, housing 18 may include other components associated with system 100 such as an inverter/alternator, ventilation, or other cooling elements, and the like.

In certain embodiments, blade assembly 12 may comprise vertically elongated blades. In some embodiments, the blades may be flexible and are configured to wrap around blade tube 10, wherein a strap may be used to hold the blades against tube 10. In some further embodiments, tube 10 may include grooves for receiving the blades when the blades are folded against the tube. In some embodiments, the blades may be made of thin metal or steel, but are not limited to this option. In some embodiments, the blades may be Savonius or similar type blades, as depicted in the figures. In certain embodiments, each blade may have a length to radius ratio which is greater than 1, or greater than 5, or greater than 10. In some embodiments, the blades may be between approximately 10 feet to approximately 20 feet in length but are not limited to this option. In some embodiments, blade assembly may comprise 4 blades, as shown. It shall be appreciated however, that any number of blades may be used and that the blades may have different geometric configurations and sizes in alternate embodiments.

In one embodiment, rotating tube 10 may be segmented and includes multiple cylindrical sections which are spaced apart for reduced weight. However, in other embodiments, rotating tube 10 may be a single tube piece. In some further embodiments, connection brackets 11 may be provided for connecting each blade of blade assembly 12 to tube 10 (also referred to as "segmented tube 10"), as well as connecting the cylindrical sections to one another. In some embodiments, connection brackets 11 may allow the blades may be removed and reconnected in opposite direction to change or reverse the rotational orientation of blade assembly 12. It shall be appreciated however that in alternate embodiments, blade assembly may be directly coupled to rotating tube 10.

In further embodiments, rotating tube 10 including blade assembly 12 may be coupled to a top end of shaft 22. In one embodiment, a top end of tube 10 may comprise a horizontal tube cover 10A including a central hole 10B through which shaft 22 may pass. Shaft 22 may further comprise a threaded shaft end 23 allowing it to be secured at central hole 10B via a lower nut 24 engaged to shaft below cover 10A and a top wing nut 25 with rubber washer 15 threaded above cover 10A, the lower nut 24 and top wing nut 25 compressing against cover 10A to securely hold tube 10 to shaft 22. Stationary internal tube 30 may similarly comprise a top horizontal cover 30A including shaft hole 30B through which shaft 22 may pass. Thus, shaft 22 is housed within stationary internal tube 30 which nests within rotating tube 10. In some embodiments, spacing is provided between the outer walls of stationary internal tube 30 and inner walls of rotating tube 10, and between the outer surface of shaft 22 and surrounding walls of shaft hole 30B, to avoid added friction as rotating tube 10 spins. In some other embodiments, a spacer made of a low friction and preferably corrosive-resistant material (e.g., plastic, stainless steel, etc.) may be provided between the components. It shall be appreciated that low friction contact surfaces between internal tube 30, shaft 22, and rotating tube 10 may be provided in alternate embodiments. It shall be appreciated that different methods of securing shaft 22 to rotating tube 10 may be used in alternate embodiments.

In certain embodiments, a top cap structure 14 may be coupled to the top end of rotating tube 10 over top end cover 10A. Top cap structure 14 may enhance the aesthetic appearance of system 100 and/or include an illumination element, which may be solar powered in some embodiments. In one embodiment, top cap structure 14 may comprise a hollow dome or egg shaped structure that caps tube 10. However different design configurations may be used in alternate embodiments.

In certain embodiments, each of upper magnetic component 28 and lower magnetic component 29 may have a ring structure which surrounds shaft 22. Additionally, upper magnetic component 28 and lower magnetic component 29 are oriented in opposing polarity, wherein upper magnetic component 28, which is connected to shaft 22, levitates above lower magnetic component 29 which is affixed to internal stationary tube 30. Upper magnetic component 28 may be directly attached to shaft 22 and/or attached via a shaft collar 32 as shown. Additionally, lower magnetic component 29 may be supported on a ring shelf 30C within stationary tube 30. In one embodiment, spacing may be provided between lower magnetic component 29 and shaft 22 so that shaft 22 is unincumbered by friction from lower magnetic component 29 as it spins or displaces vertically. In some embodiments, each of upper magnetic component 28 and lower magnetic component 29 may comprise neodymium or iron nitride magnets but are not limited to this option. In certain embodiments, each of upper magnetic component 28 and lower magnetic component 29 may comprise a plurality of magnets which may be arranged in a circular orientation as exemplified in FIG. 7. In one embodiment, each of upper magnetic component 28 and lower magnetic component 29 may comprise 5 cylindrical magnets, arranged around shaft 22 as shown. However, any number of magnetic components, including single piece magnets may be used in alternate embodiments. As such, a repulsive force between upper and lower magnetic components 28, 29 provides a lift force on shaft 22 along with rotating tube 10 to reduce or eliminate the effective weight of the spinning components of the system.

As such, the disclosed subject matter provides an energy generating system which may be configured to power multiple generators via a single rotating shaft. In some embodiments, up to 4 generators may be engaged with rotating shaft. In certain embodiments, the width of deployed blade assembly 12 may be less than the width/diameter of housing 18, or less than about ½ of the width of the housing, for added stability and safety. It shall be appreciated however, that different relative sizes may be used in alternate embodiments.

It shall be appreciated that the disclosed system and system components can have multiple configurations in different embodiments. It shall be appreciated that system 100 may incorporate other components as known in the art for conversion, storage, and/or use of wind energy. It shall be appreciated that system 100 may be configured for different uses in alternate embodiments.

It shall be appreciated that the components of system 100 may comprise any alternative known materials in the field and be of any size and/or dimensions. In certain embodiments, components of system 100 may be made of plastic, metal, and the like. Such components may further be non-magnetic and/or configured to not interfere with the functionality of the magnetic assembly. It shall be appreciated that the components of system 100 may be manufactured and assembled using any known techniques in the field. Furthermore, the components of system 100 may be provided as an assembled unit and/or as a kit for assembly by the end user, according to alternate embodiments.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed system as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An energy generator system, comprising:
   a vertical shaft;
   a blade assembly comprising vertically elongated blades, the blade assembly supported on the vertical shaft and configured to spin the vertical shaft;
   at least one generator including a generator battery configured to harness energy via a rotation of the vertical shaft effectuated by wind forces on the blade assembly;
   a transfer gear coupled between the vertical shaft and the generator, the transfer gear configured to transfer rotation of the vertical shaft to a generator shaft coupled between the transfer gear and the generator, wherein the vertical shaft is at a right angle to the generator shaft;
   a base housing configured to house the transfer gear, the generator, and the generator battery, the base housing including a side wall and a top wall over the side wall, the top wall including an opening into which a lower end of the vertical shaft extends;
   a shaft connector coupled between the transfer gear and the vertical shaft and configured to be rotated by the vertical shaft, the shaft connector being below and in vertical alignment with the vertical shaft; and
   a cooling fan mounted to a portion of the vertical shaft which extends into the base housing, wherein the cooling fan is configured to spin together with the vertical shaft for providing cooling within the base housing.

2. The energy generator system of claim 1, wherein the energy generator system comprises multiple generators coupled to the transfer gear, the transfer gear being a multiple output right angle gear and is configured to receive multiple generator shafts, wherein each generator is coupled to the transfer gear via one of the multiple generator shafts.

3. The energy generator system of claim 1, the base housing comprising at least one housing access door within the side wall of the housing and/or at least one top access hatch door within the top wall of the housing.

4. The energy generator system of claim 3, further comprising a fence around the base housing, the fence comprising at least one fence door.

5. The energy generator system of claim 1, wherein the base housing includes a shelf, wherein the generator and transfer gear are supported on the shelf, and the battery is situated below the shelf.

6. The energy generator system of claim 1, wherein:
   the blade assembly comprises multiple blades coupled to a blade tube,
   the blade tube includes a horizontal tube cover, the horizontal tube cover including a central hole,
   the vertical shaft being attached to blade tube at the horizontal tube cover and extending into the blade tube and further into a stationary tube which is nested within the blade tube,
   the stationary tube is affixed at its base to the top wall of the base housing, and
   an internal hollow of the stationary tube is continuous with the opening in the top wall of the base housing, allowing the vertical shaft to extend into the base housing.

7. The energy generator system of claim 6, wherein the blade tube is segmented and includes multiple cylindrical sections which are spaced apart from one another.

8. The energy generator system of claim 1, wherein the transfer gear is a right-angle speed reducer with built-in safety brake.

9. The energy generator system of claim 1, wherein a width of the blade assembly is less than a width of the base housing.

10. The energy generator system of claim 1, wherein the shaft connector comprises a vertical member with at least one flat side surface, configured to be received within a correspondingly configured hollow in a bottom end of the vertical shaft.

* * * * *